Sept. 12, 1967         H. J. TYLER         3,341,119

CONTROL DEVICE AND PARTS THEREFOR OR THE LIKE

Filed June 7, 1965         7 Sheets-Sheet 2

INVENTOR
HUGH J. TYLER

BY

HIS ATTORNEYS

Sept. 12, 1967   H. J. TYLER   3,341,119
CONTROL DEVICE AND PARTS THEREFOR OR THE LIKE
Filed June 7, 1965   7 Sheets-Sheet 5

INVENTOR
HUGH J. TYLER

BY
*Candor & Candor*

HIS ATTORNEYS

Sept. 12, 1967          H. J. TYLER          3,341,119
CONTROL DEVICE AND PARTS THEREFOR OR THE LIKE
Filed June 7, 1965          7 Sheets-Sheet 6

INVENTOR
HUGH J. TYLER

BY

*Candor & Candor*

HIS ATTORNEYS

Sept. 12, 1967           H. J. TYLER           3,341,119

CONTROL DEVICE AND PARTS THEREFOR OR THE LIKE

Filed June 7, 1965           7 Sheets-Sheet 7

INVENTOR
HUGH J. TYLER

BY

*Cauder & Cauder*

HIS ATTORNEYS

United States Patent Office 3,341,119
Patented Sept. 12, 1967

3,341,119
CONTROL DEVICE AND PARTS THEREFOR
OR THE LIKE
Hugh J. Tyler, Jeannette, Pa., assignor to Robertshaw Controls Company, Richmond, Va., a corporation of Delaware
Filed June 7, 1965, Ser. No. 461,985
14 Claims. (Cl. 236—51)

ABSTRACT OF THE DISCLOSURE

This disclosure relates to a control device for a heating means wherein the control device can be manually set to maintain the temperature effect of the heating means at a selected temperature effect with the control device being adapted to be automatically adjusted after the occurrence of an event to tend to maintain the temperature effect of the heating means at a different temperature effect, the control device including a member for adjusting the control device to maintain the second temperature effect after the occurrence of the event and normally being movable to its adjusting position but being maintained in its nonadjusting position by a latch member with the latch member being movable to its unlatching position in response to the occurrence of the event so as to cause automatic adjustment of the control device.

---

This invention relates to an improved control device for controlling the operation of a heating means or the like as well as to improved parts for such a control device or the like.

One feature of this invention is to provide an improved control device for controlling the operation of the burner means of a domestic oven or the like in such a manner that the control device can be set at a selected temperature to cook food in the oven at the selected temperature until the occurrence of an event, such as the lapse of a predetermined time or the operation of a meat probe, etc., at which time the control device will automatically reset itself to maintain the temperature of the oven at a lower non-cooking temperature whereby the cooked food therein will remain at a palatable condition without further cooking thereof for any desired period of time.

In this manner, the housewife or the like can set the control device of this invention to cook a roast or the like at a high cooking temperature for a period of time whereby after that period of time the temperature of the oven will be reduced to a non-cooking but palatable maintaining temperature for a long period of time so that when the housewife returns, the food can then be served.

Accordingly, it is an object of this invention to provide an improved control device having one or more of the novel features set forth above or hereinafter shown or described.

Another object of this invention is to provide an improved part for such a control device or the like.

Other objects, uses and advantages of this invention are apparent from a reading of this description which proceeds with reference to the accompanying drawings forming a part thereof and wherein:

FIGURE 16 is an exploded perspective view of the heat motor arrangement of this invention.

Figure 1:
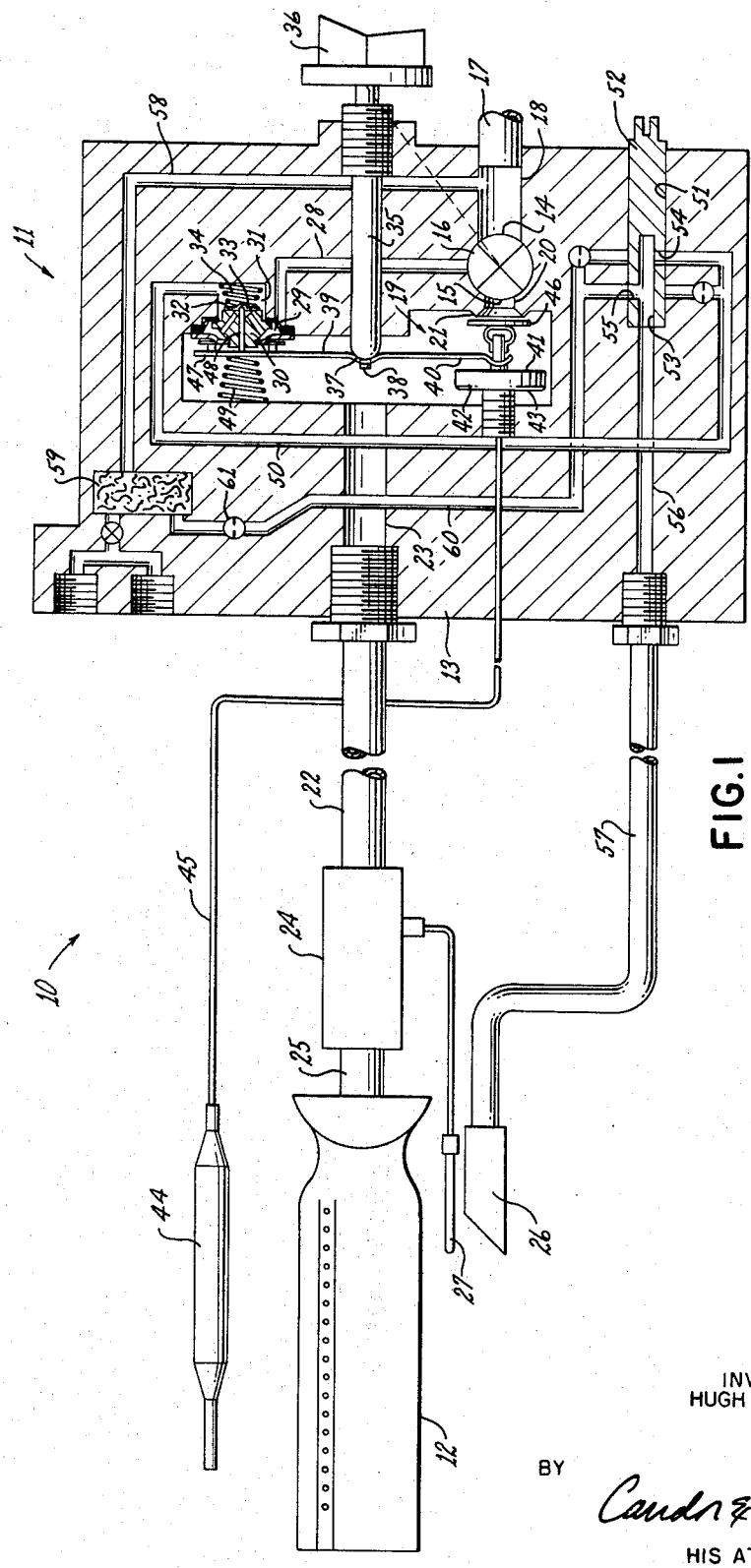
FIGURE 1 is a schematic view illustrating the improved system of this invention.

While the various features of this invention are hereinafter described and illustrated as being particularly adaptable to provide a control device for a fuel burning domestic oven or the like, it is to be understood that the various features of this invention can be utilized singly or in any combination thereof to provide a control device for other structure as desired.

Therefore, this invention is not to be limited to only the embodiment illustrated in the drawings because the drawing are merely utilized to illustrate one of the wide variety of uses of this invention.

Referring now to FIGURE 1, the improved control system of this invention generally indicated by the reference numeral 10 includes a control device 11 of this invention for controlling the operation of a main burner means 12 disposed in a domestic oven or the like, the control device 11 including a housing means 13.

The housing means 13 has an inlet 14 and an outlet 15 adapted to be interconnected together by a disc valve member 16 in a manner hereinafter described, the inlet 14 being adapted to be interconnected to a fuel supply conduit 17 by a passage means 18 and the outlet 15 being adapted to be interconnected to a chamber 19 by means of a passage means 20 terminating with a valve seat 21. The chamber 19 is adapted to be interconnected to a conduit 22 by means of a passage 23, the conduit 22 leading to a safety valve 24. The outlet side of the safety valve 24 is interconnected to the main burner 12 by a conduit 25.

A pilot burner 26 is disposed in the oven and is adapted to normally have a continuously burning small standby flame in a manner hereinafter described. However, when additional fuel is supplied to the pilot burner 26 in a manner hereinafter described, the same provides a relatively large heater flame which is sensed by a bulb 27 to open the safety valve 24 and interconnect the conduits 22 and 25 together whereby as long as a heater flame appears at the pilot burner 26, the chamber 19 of the control device 11 is interconnected to the main burner 12.

However, when the heater flame ceases to exist at the pilot burner 26, the safety valve 24 closes and prevents communication between the chamber 19 of the control device 11 and the main burner means 12 for a purpose hereinafter described.

When the disc valve 16 is moved to an "on" position thereof in a manner hereinafter described, the same not only interconnects the inlet 14 with the outlet 15 but also interconnects the inlet 14 with the passage means 28 leading to a chamber 29 defined by a valve seat member 30 carried by the housing 13. The chamber 29 is separated from a chamber 31 by a valve seat 32 on the valve seat member 30, the valve seat 32 being opened and closed by a valve member 33 urged to the closed position by a compression spring 34.

An axially movable fulcrum pin 35 is carried by the housing 13 in such a manner that the axial position of the fulcrum pin 35 relative to the housing 13 is controlled by a control knob 36 in a manner hereinafter described. The fulcrum pin 35 has a rounded end 37 provided with a cylindrical projection 38 passing through a suitable aperture in a lever 39 whereby the lever 39 is fulcrumed on the end 37 of the fulcrum pin 35.

One end 40 of the lever 39 bears against a movable wall 41 of an expansible and contractible element 42 having a wall 43 fixed to the housing 13, the interior of the expansible and contractible element 42 being interconnected to an oven temperature sensing bulb 44 by a conduit 45. The movable wall 41 of the expansible and contractible element 42 carries a valve member 46 for opening and closing the valve seat 21 in a manner hereinafter described.

The other end 47 of the lever 39 is adapted to engage a plunger 48 carried by the valve seat member 30 and engaging the valve member 33, the end 47 of the lever 39 being urged in a clockwise direction in FIGURE 1 by a compression spring 49. Thus, the opening and closing of the valve member 33 is controlled by the lever 39 in relation to the temperature sensed by the bulb 44 and the axial position of the fulcrum pin 35 in a manner hereinafter described.

The chamber 31 of the housing 13 is interconnected to a passage means 50 leading to a bore 51 in the housing 13, an adjusting key 52 being rotatably disposed in the bore 51 and having a longitudinal bore 53 interconnected to the exterior of the key 52 by transverse bores 54 and 55. The longitudinal bore 53 of the adjusting key 52 is disposed in communication with a passage 56 leading to a conduit 57 interconnected to the pilot burner 26.

Another passage 58 is formed in the housing 13 and is interconnected with the passage 18 at a point upstream from the disc valve 16 as well as to a filter chamber 59. The filter chamber 59 is interconnected to a passage 60 leading to the bore 51 in the manner illustrated in FIGURE 1, the passage 60 having an orifice 61 therein.

Thus, it can be seen that when the adjusting key 52 is disposed in the "on" position, as illustrated in FIGURE 1, fuel from the supply conduit 17 is adapted to pass through the passages 58 and 60 to the passage 55 of the adjusting key 52 and, thus, to the pilot burner 26 to provide the previously mentioned small standby flame, which does not affect the safety valve 24.

However, when the disc valve 16 is moved to an opened position and the valve member 33 is moved to an opened position in a manner hereinafter described, the additional fuel being supplied through the passage 50 to the passage 54 of the adjusting key 52 causes the pilot burner 26 to provide a large heater flame which is sensed by the bulb 27 and causes the safety valve 24 to open and interconnect the conduit 22 and 25 together so that fuel can issue from the main burner 12 and be ignited by the pilot burner 26. However, when the valve member 33 closes, the additional supply of fuel to the pilot burner 26 is terminated whereby the large heater flame ceases to exist, even though the small standby flame continues, whereby the safety valve 24 will close and prevent fuel from issuing from the main burner 12.

Thus, as the valve member 33 cycles between its opened and closed positions in a manner hereinafter described, the main burner 12 is cycled on and off to maintain the temperature of the oven at a temperature selected by the control knob 36 in a manner hereinafter described.

Figure 5:
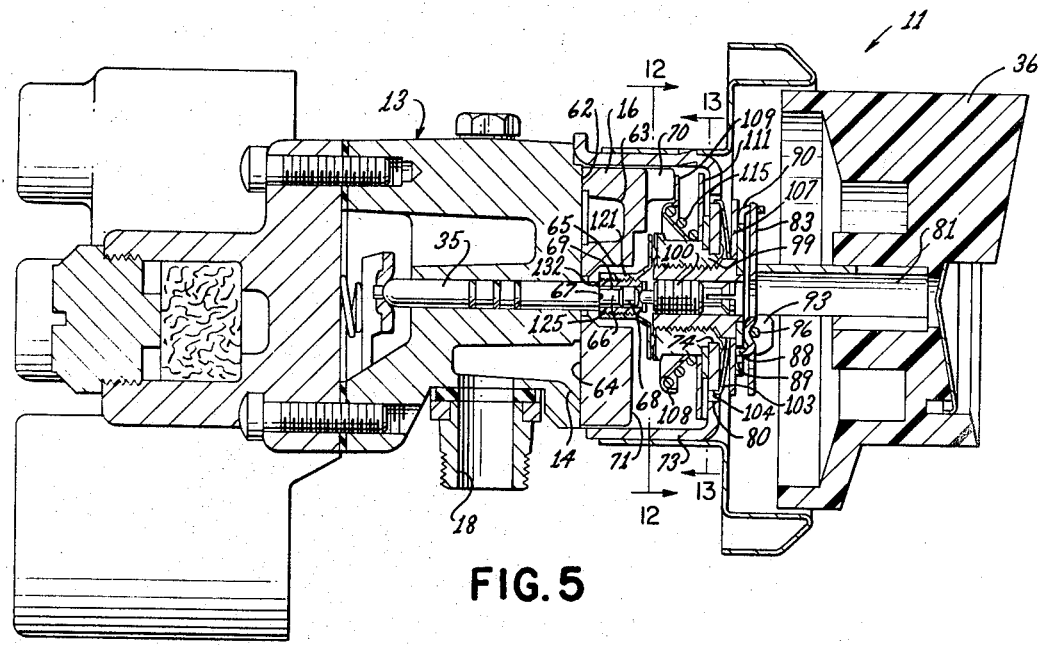
FIGURE 5 is a cross-sectional view taken on line 5—5 of FIGURE 2.
Figure 4:
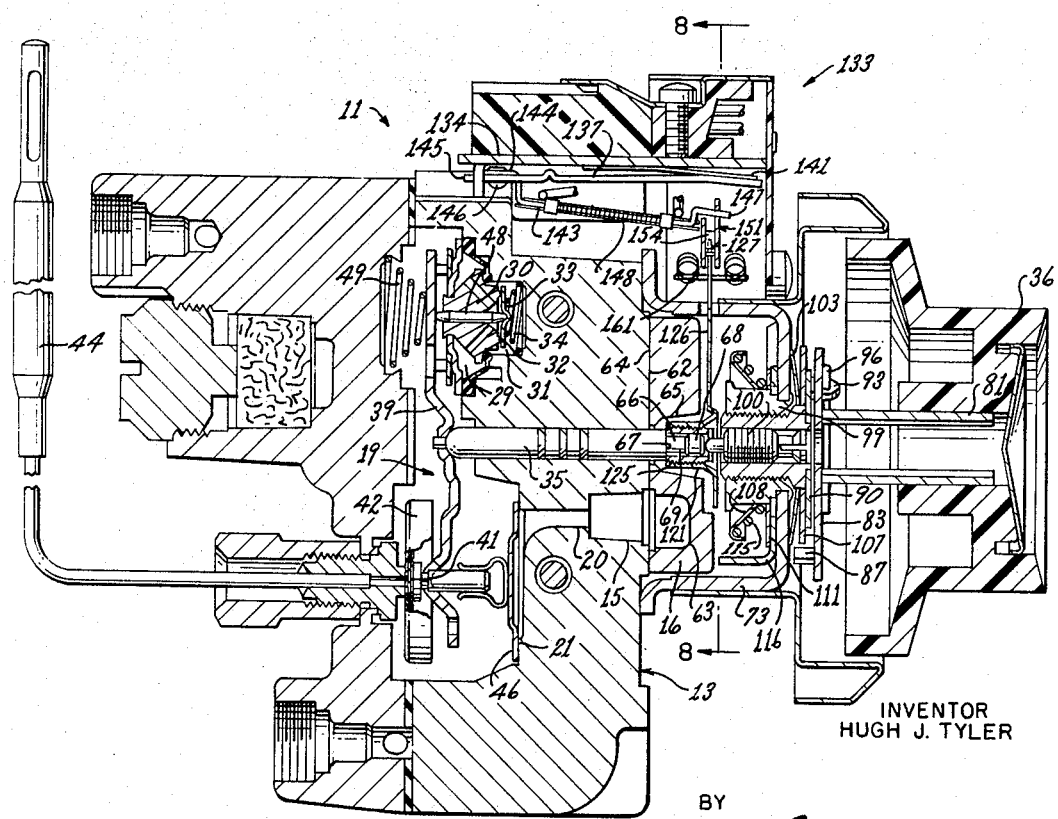
FIGURE 4 is a cross-sectional view taken on line 4—4 of FIGURE 2.

As illustrated in FIGURES 4 and 5, the housing means 13 defines a flat surface 62, interrupted by the spaced inlet 14 and outlet 15 adapted to be interconnected together by a groove 63 in the disc valve 16.

In particular, the groove 63 in the disc valve 16 interrupts a valve surface 64 thereof with the valve surface 64 being disposed in sealing and sliding contact with the valve seat surface 62 of the housing 13, the disc valve 16 having an opening 65 passing therethrough and loosely receiving the end 66 of the fulcrum pin 35. The end 66 of the fulcrum pin 35 defines an annular shoulder 67 spaced from a cylindrical portion 68 by a reduced cylindrical portion 69 for a purpose hereinafter described.

Figure 6:
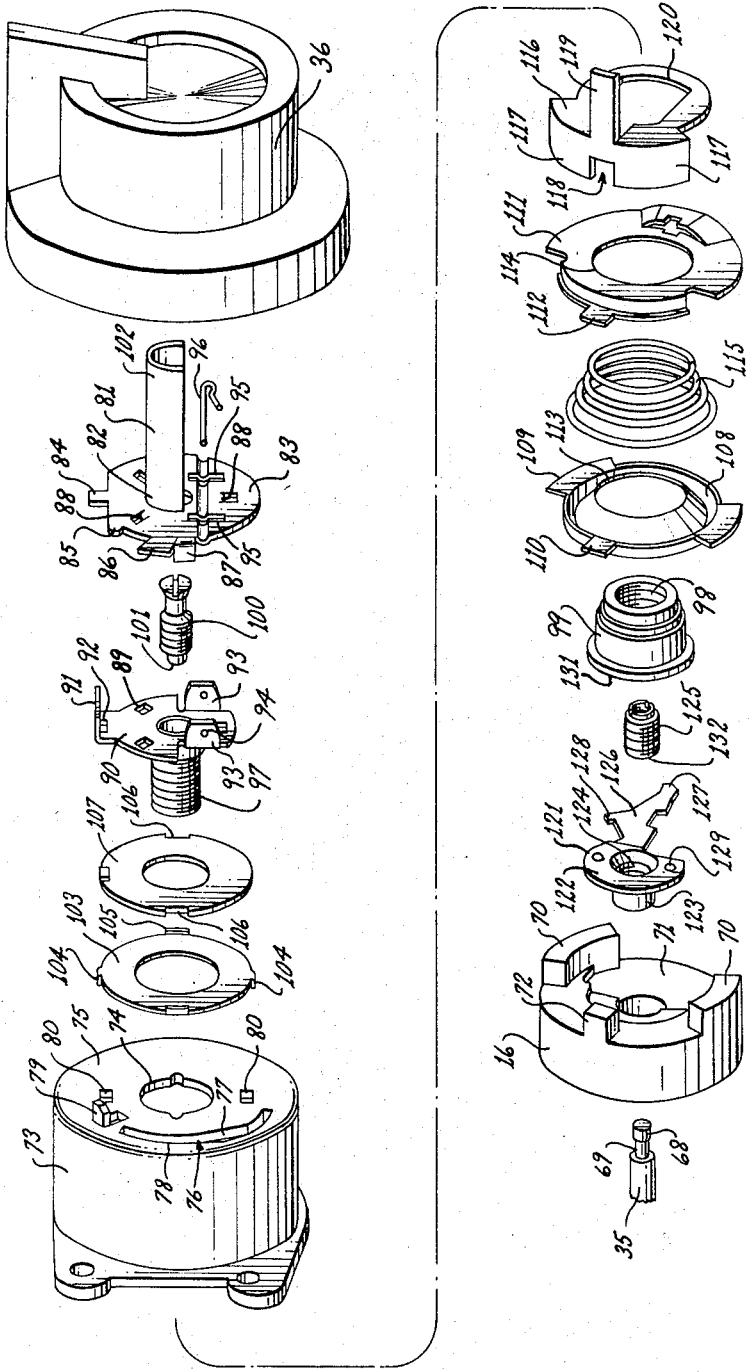
FIGURE 6 is an exploded perspective view of various parts of the control device of this invention.

As illustrated in FIGURES 5 and 6, the disc valve 16 has a pair of spaced arcuate embossments 70 formed on the side 71 thereof and a smaller substantially rectangular embossment 72 intermediate the embossments 70 for a purpose hereinafter described.

A cup-shaped member 73 forms part of the housing means 13 and is telescopically disposed over the disc valve 16, the member 73 having an aperture 74 passing therethrough in the closed end 75 thereof. The closed end 75 has a cam slot 76 formed therein and defining opposed camming edges 77 and 78 best illustrated in FIGURES 2 and 3. In addition, a stop tang 79 projects from the wall 75 and a pair of apertures 80 pass through the wall 75.

A C-shaped shaft 81 has one end 82 thereof interconnected to a plate member 83 having three outwardly projecting tangs 84, 85 and 86 and a rearwardly extending tang 87 to cooperate with the stop tang 79 in a manner hereinafter set forth. In addition, rearwardly directed tangs 88 are formed in the plate member 83 and are adapted to register with apertures 89 formed on another plate member 90.

The plate member 90 has a bent over tang 91 provided with a slot 92 and a pair of ears 93 having apertures 94 passing therethrough. The members 83 and 90 are adapted to be assembled together with the tang 84 of the member 83 received in the slot 92 of the member 90 and with the ears 93 of the member 90 passing through slots 95 of the plate member 83 and pinned thereto by a pin means 96 passing through the apertures 94. In this manner, rotation of the shaft 81 causes like rotation of the plate member 90.

The plate member 90 carries a tubular extension 97 both internally and externally threaded, the tubular extension 97 adapted to be threadedly received in a threaded bore 98 of a member 99 fixed in the aperture 74 of the housing part 73.

An adjusting screw 100 is threaded in the tubular part 97 of the plate 90 and has an end 101 adapted to abut the end 66 of the fulcrum pin 35.

Thus, rotation of the control knob 36 fastened on the other end 102 of the C-shaped shaft 91 causes the member 97 to be threaded into or out of the fixed threaded member 99 to adjust the axial position of the fulcrum pin 35.

A bowed spring-like washer 103 is provided and has tangs 104 adapted to register in the apertures 80 of the housing part 73, the spring means 103 having reversely directed tangs 105 adapted to be received in notches 106 in a washer-like member 107, the spring member 106 and washer-like member 107 being disposed between the closed wall 75 of the housing part 73 and the plate member 90 to place an outward force on the plate-like member 90, and, thus, provide "feel" in adjusting the rotational position of the knob 36 relative to the housing 13.

A spring retainer 108 is provided and has outwardly directed tangs 109 adapted to rest on the embossments 70 of the disc valve 16 and another tang 110. Another spring retainer 111 is provided and has an outwardly directed tank 112 similar to tang 110 of the spring retainer 108, retainers 108 and 111 respectively having openings 113 and 114 passing therethrough so that the same can be telescoped on the fixed thread member 99. A compression spring 115 is adapted to be disposed between the spring retainers 108 and 111 to compact a clutch member 116 against the inside surface of the wall 75 of the housing part 73.

The clutch part 116 has a pair of depending flanges 117 defining a notch 118 therebetween adapted to not only receive the tangs 112 and 110 of the spring retainers 111 and 108, but to also receive the rectangular embossment 72 of the disc valve 16. In addition, the clutch member 116 has an outwardly directed tang 119 adapted to pass through the cam slot 76 of the housing part 73, the clutch part or drive member 116 having an aperture 120 passing therethrough to loosely receive the fixed member 99.

The operation of the control device 11 as utilized in the system 10 of this invention, with the parts heretofore described, will now be described.

Figure 2:
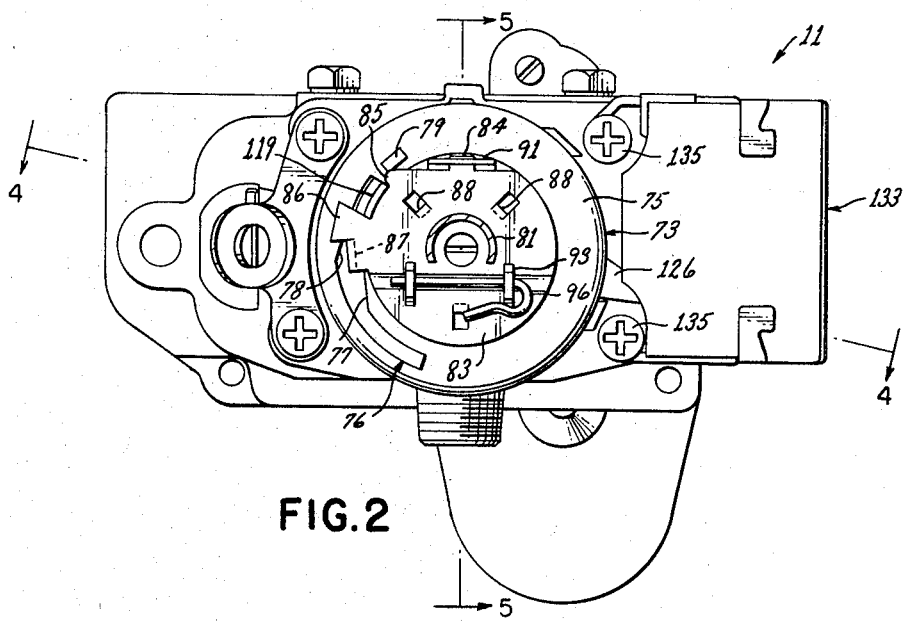
FIGURE 2 is a front view of the control device of this invention with the control knob thereof removed.

Assuming that the control knob 36 is disposed in its "off" position as illustrated in FIGURES 1 and 2, the groove 63 of the disc valve 16 is in such a position that the same does not interconnect the inlet 14 with the outlet 15 nor the inlet 14 with the passage means 28 whereby no fuel issues from the main burner means 12 and only a small standby flame exists at the pilot burner 26 as the adjusting key 42 is normally disposed in the "on" position as illustrated in FIGURE 1.

Figure 7:
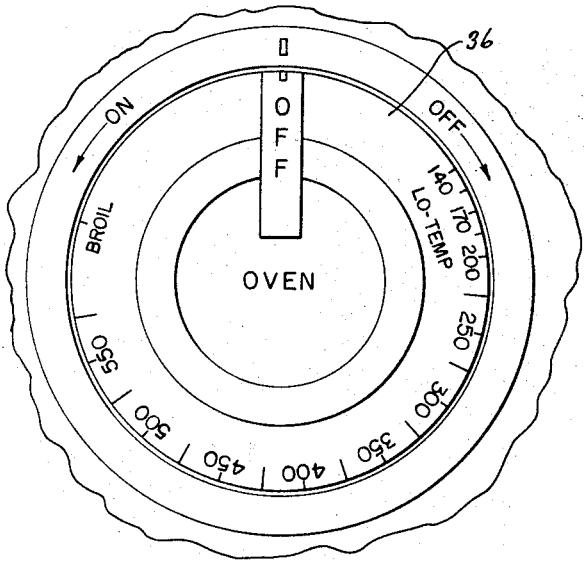
FIGURE 7 is a fragmentary front view of the control device of this invention illustrating the control knob thereof.

When the operator desires to turn on the oven to a set temperature thereof, the operator grasps the knob 36 and rotates the same in a counterclockwise direction as illustrated in FIGURE 7 whereby rotation of the knob 36 causes like rotation of the plate 83 whereby the tang 85 of plate 83 bears against the tang 119 of the drive member 116 to cause like rotation therewith. As the drive member 116 is being rotated, the same, through the notch 118 thereof, rotates the spring retainers 111 and 108 as well as the disc valve 16 to bring the groove 63 of the disc valve 16 in such a position that the same fully interconnects the inlet 14 with the outlet 15, as well as to the passage means 28.

Figure 3:
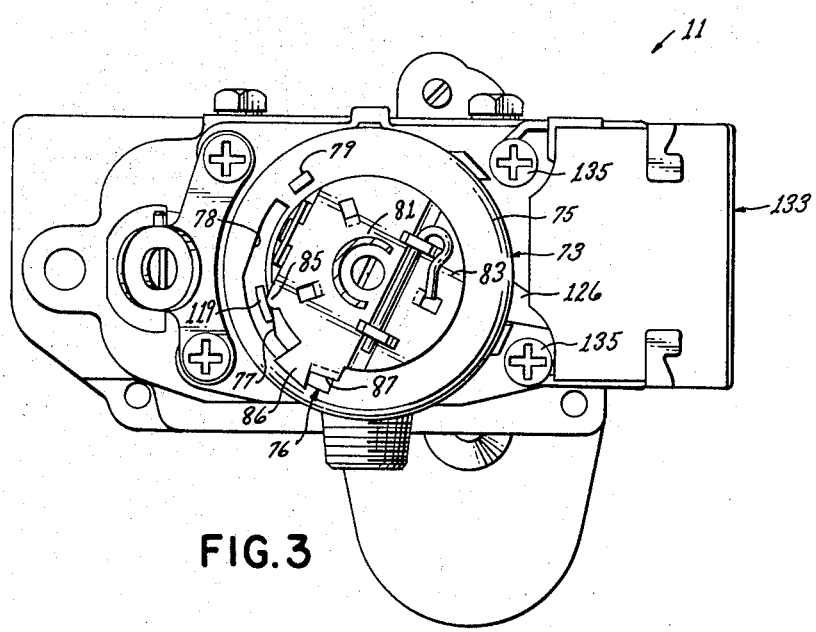
FIGURE 3 is a view similar to FIGURE 2 and illustrates the control device of this invention in another operating position thereof.
Figure 14:
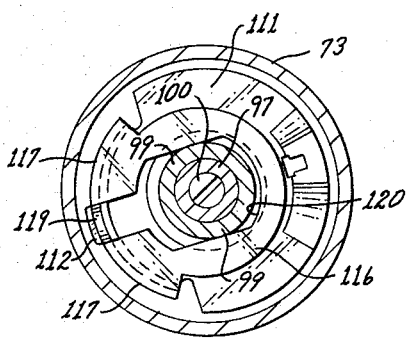
FIGURE 14 is a view similar to FIGURE 13 and illustrates the control device in another operating position thereof.

However, when the disc valve 16 is rotated to its fully "on" position, it can be seen that the edge 77 of the cam slot 76 slides the drive member 116 radially outwardly to the position illustrated in FIGURES 3 and 14 whereby the tang 85 of the plate member 83 is no longer in engagement with the tang 119 of the drive member 116 so that the control knob 36, when further rotated in a counterclockwise direction, does not further rotate the disc valve 16 from its fully "on" position. Thus, the sliding movement of the drive member 116 declutches the disc valve 16 from the control knob or manipulator means 36.

During the rotational movement of the control knob 36 from its position to a set temperature position thereof, the threaded member 97 of the plate 90 is backed out of the fixed threaded member 99 in such a manner that the fulcrum pin 35 is adjusted to a new position thereof to the right in FIGURES 4 and 5 as selected by the temperature setting of the control knob 36.

This axial movement of the pin 35 from its "off" position to its selected temperature position permits the compression spring 49 to pivot the same on the fulcrum pin 35 in such a manner that the pin 48 carried by the valve seat member 30 is moved to the right in FIGURE 4 to open the valve member 33 away from the valve seat 32 so that fuel in the passage 28 is now adapted to pass into the chamber 31 and, thus, to the pilot burner 26 to create the large heater flame at the pilot burner 26. When the large heater flame exists at the pilot burner 26, the temperature sensing bulb 27 senses the presence of the same and opens the safety valve 24 whereby fuel in the chamber 19 is adapted to flow to the main burner 12 and be ignited by the pilot burner 26.

Thus, as long as the temperature of the oven remains below the selected temperature, the main burner means 12 is operating.

However, when the temperature of the oven reaches the selected temperature, as sensed by the sensing bulb 44, the movable wall 41 of the expansible and contractible element 42 has moved to the right in FIGURE 4 to such an extent that the same pivots the lever 39 on the fulcrum pin 35 to a position which permits the valve member 33 to close against the valve seat 32 and terminate the additional flow of fuel to the pilot burner 26. Thus, the large heater flame at the pilot burner 26 ceases to exist whereby the safety valve 24 closes to terminate the flow of fuel to the main burner means 12.

Should the temperature of the oven again fall below the selected temperature, the movable wall 41 of the element 42 has moved to the left in FIGURE 4 a distance sufficient to cause the lever 39 to again open the valve member 33 so that the heater flame can again exist at the pilot burner 26. With the heater flame at the pilot burner 26, the safety valve 24 again opens so that fuel can again issue from the main burner means 12 and be ignited by the pilot burner 26.

Thus, it can be seen that the control device 11 in this invention permits the control knob 36 to be turned from an "off" position thereof to not only rotate the disc valve 16 to an "on" position thereof but to also adjust the axial position of the fulcrum pin 35 so that the control device 11 will maintain the oven at the selected temperature, the control device 11 of this invention being so constructed and arranged that the drive member 116 declutches the disc valve 16 from the control knob 36 during the rotational movement of the control knob 36 after the disc valve 16 has been disposed in its fully "on" position.

Should a malfunction occur in the control device 11 of this invention, so that the valve member 33 will not close whereby the burner means 12 remains on in a runaway condition, the increased temperature in the oven will cause the movable wall 41 of the pilot element 42 to further move to the right in FIGURE 4 to bring the valve member 46 closer to the valve seat 21 to throttle the flow of fuel to the burner means 12 in such a manner that the burner means 12 cannot produce a temperature in the oven above a predetermined safe temperature.

Figure 13:
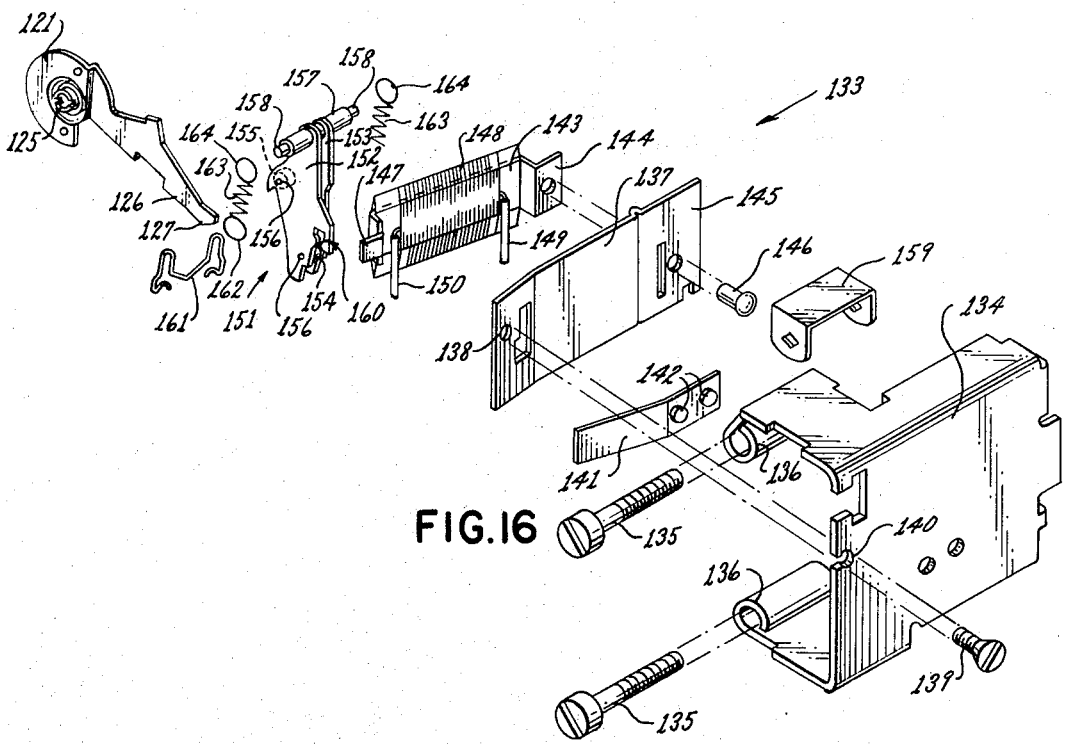
FIGURE 13 is a cross-sectional view taken on line 13—13 of FIGURE 5.
Figure 13:
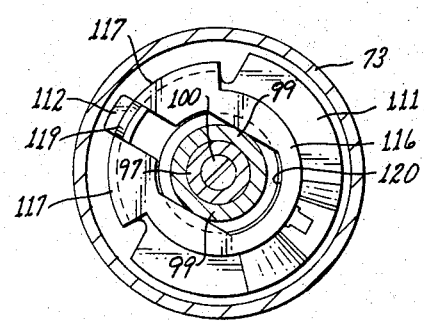

When it is desired to turn off the system 10 of this invention, the operator rotates the control knob 36 back to the "off" position illustrated in FIGURE 2. As the plate 83 is being rotated to its "off" position, the tang 86 thereof engages the tang 119 of the drive member 116 and rotates the drive member 116 therewith whereby the disc valve 16 is rotated back to its "off" position, the drive member 116 sliding radially inwardly relative to the disc valve 16 by means of the edge 78 of the cam slot 76 in the housing part 73 from the position illustrated in FIGURE 14 back to the position illustrated in FIGURE 13. As the control knob 36 is rotated back to its "off" position, the tang 119 on the drive member 116 engages the end of the slot 76 when the control knob is disposed in its "off" position whereby the cam slot 76 determines the "off" position of the control knob 36.

However, when the control knob 36 is moved in an "on" direction, the fully "on" position of the control knob 36 is limited by the tang 87 of the plate 83 engaging the stop tang 79 on the housing part 73.

As previously set forth, the control device 11 of this invention is adapted to automatically reduce the temperature setting of the control device 11 after the occurrence of an event even though the control device has been set at a high cooking temperature in the manner previously set forth.

In particular, it can readily be seen in FIGURES 5-6 that an actuator 121 is provided and comprises a plate-like member 122 having a tubular extension 123 which is internally threaded at 124 to threadedly receive a hollow tubular member 125 which is externally threaded into the tubular extension 123 of the actuator 121. The actuator 121 has an integral outwardly extending arm 126 provided with a free end 127 and an outwardly extending tang 128 for a purpose hereinafter described.

Figure 12:
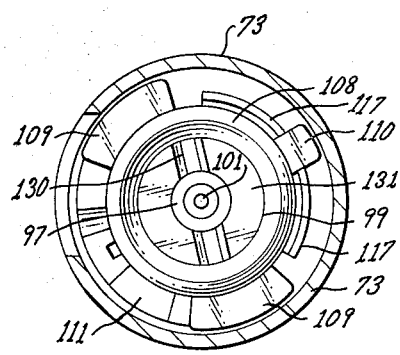
FIGURE 12 is a cross-sectional view taken on line 12—12 of FIGURE 5.

The assembled members 121 and 125 are adapted to telescopically receive the end 66 of the fulcrum pin 35 in the manner illustrated in FIGURES 4 and 5 with the plate portion 122 of the actuator 121 having outwardly extending embossments 129 normally received in recesses 130 formed in the end surface 131 of the fixed member 99 as illustrated in FIGURE 12.

In this manner, the fulcrum pin 35 is adapted to be axially adjusted relative to the actuator 121 by having the end 66 thereof movable in the bore of the threaded member 125. However, the end 132 of the threaded member 125 carried by the actuator 121 is adapted to engage the shoulder 67 of the fulcrum pin 35 for a purpose hereinafter set forth.

Figure 8:
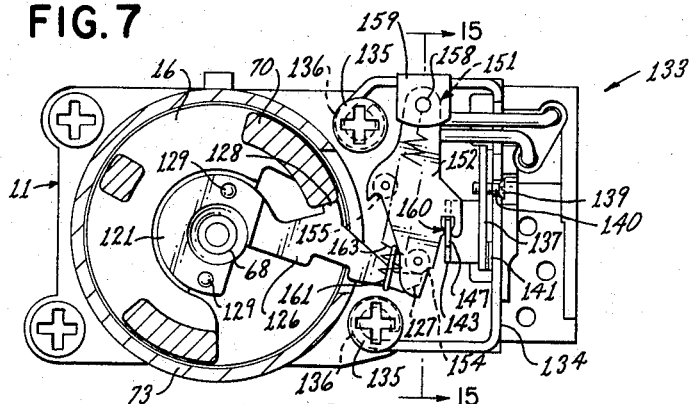
FIGURE 8 is a cross-sectional view taken on line 8—8 of FIGURE 4.

A heat motor 133 is provided and a casing member 134 thereof adapted to be fastened to the housing means 13 by threaded fastening members 135 passing through hollow cylindrical members 136 of the casing 134 in the manner illustrated in FIGURE 8.

A plate-like member 137 is provided and has a threaded aperture 138 adapted to receive a threaded member 139 passing through an aperture means 140 of the casing 134 to attach the plate 137 thereto. A spring member 141 is fastened to the inside of the casing 134 by rivet means 142 so as to be disposed between the plate 137 and the casing 134 whereby the position of the plate 137 relative to the casing 134 can be adjusted by adjusting the threaded relation of the threaded member 139 relative to the plate 137.

A bimetal member 143 is provided and has one end 144 fastened to the end 145 of the plate member 137 by rivet means 146 whereby the other end 147 of the bimetal member 143 is free to move relaitve to the plate 137. A heating coil 148 is disposed around the bimetal member 143 and has a pair of leads 149 and 150 to be attached to any suitable structure.

For example, the leads 149 and 150 can be placed across a power source by the manual throwing of a switch or by having the switch closed by means of a time clock, a meat probe, or the like, for a purpose hereinafter described.

A latch member 151 is provided and comprises a pair of plates 152 and 153 held in spaced relation by a pair of interposed rollers 154 and 155 mounted on pin means 156 passing through the plate members 152 and 153 to hold the same together. The plate members 152 and 153 are pivotally mounted on a pivot pin means 157 having the opposed ends 158 thereof mounted in a bracket 159 carried by the casing means 134.

The plate member 152 of the latch member 151 has a notch 160 which receives the free end 147 of the bimetal member 143.

A clip member 161 is hooked around the free end 127 of the arm 126 of the actuator 121 and is interconnected to the ends 162 of a pair of tension springs 163 respectively having the other ends 164 thereof carried by the pivot pin means 157.

With the parts assembled in the manner illustrated in FIGURE 8 and with the control device 11 disposed in the "off" position, it can be seen that the tension springs 163 tend to rotate the actuator 121 in a counterclockwise direction. However, the latch member 151 is so disposed relative to the actuator 121 that the end 127 of the arm 126 thereof bears against the roller 154 so that the actuator 121 cannot be rotated.

In addition, the disc valve 16 is disposed in such a position that one of the embossments 70 thereof is disposed against the thang 128 of the arm 126 of the actuator 121 should the heat motor 133 be accidentally actuated when the control device 11 is in its "off" position.

The operation of the control device 11 when utilizing the heat motor means 133 of this invention will now be described.

Figure 9:
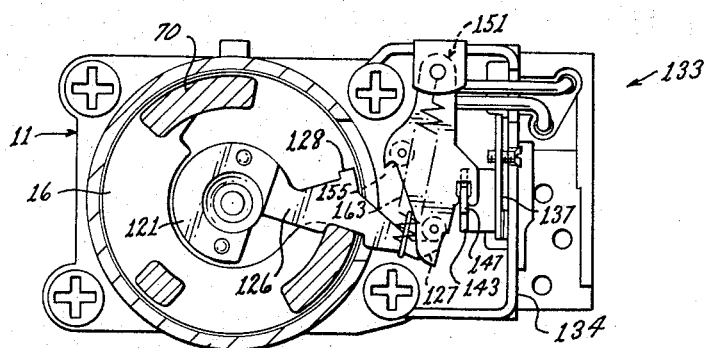
FIGURE 9 is a view similar to FIGURE 8 and illustrates the control device in another operating position thereof.

As previously set forth, the operator turns the control knob from its "off" position to any "on" position thereof whereby the disc valve 16 is moved from the position illustrated in FIGURE 8 to the position illustrated in FIGURE 9 until the clutch member 116 slides radially outwardly by means of the cam slot 76 to declutch the control knob 36 from the disc valve 16 so that the disc valve 16 remains in its full "on" position. However, further rotation of the control knob 36 in "on" direction to the selected temperature permits the fulcrum pin 35 to be axially moved to the right in FIGURES 4 and 5 until the same is set in the desired temperature setting position thereof in the manner previously described whereby the control device 11 will maintain the temperature at the selected cooking temperature.

Thus, the oven is maintained at the selected cooking temperature by means of the lever 39 and thermostat 42 in the manner previously described.

However, when it is desired to have the temperature of the oven reduced to a lower temperature setting thereof, such as a non-cooking but warmth-retaining temperature, some means energizes the coil 148 of the bimetal member 143. For example, a manual switch can be closed to place the coil 148 across a power lead or the switch can be closed by a timer clock, meat probe or the like.

Figure 10:
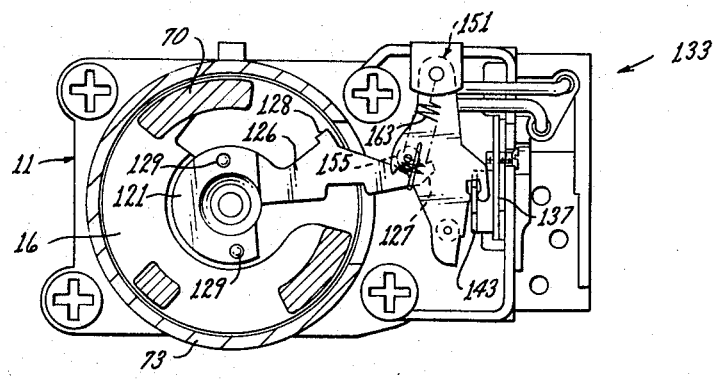
FIGURE 10 is a view similar to FIGURE 8 and illustrates the control device in still another operating position thereof.

In any event, when the coil 148 is energized, the same heats the bimetal member 143 to cause the end 147 thereof to move toward the plate 137 whereby the latch member 151 is moved from the position illustrated in FIGURE 9 to the position illustrated in FIGURE 10 so that the end 127 of the arm 126 of the actuator 121 can be moved in a counterclockwise direction by the tension spring 163 until the end 127 of the arm 126 of the actuator 121 abuts against the roller 155 of the latch member 151 in the manner illustrated in FIGURE 10.

This counterclockwise rotation of the actuator 121 causes the embossments 129 thereof to ride out of the recesses 130 on the end surface 131 of the fixed member 99 so as to cam the actuator 121 to the left in FIGURES 4 and 5 whereby the end 132 of the threaded member 125 carried by the actuator 121 pushes against the shoulder 67 of the fulcrum pin 35 and moves the same to the left to reset the axial position of the fulcrum pin 35 at a lower temperature setting thereof.

Thus, with the fulcrum pin 35 now set in a low temperature setting thereof by means of the actuator 121, the control device 11 now maintains the oven at the reduced temperature as previously determined by the threaded position of the threaded member 125 relative to the tubular extension 123 of the actuator 121.

Thus, it can be seen that initially the oven of this invention can be set at a high cooking temperature by the control knob 36 and, thereafter, the heat motor 133 can be energized in any suitable manner to automatically reduce the temperature setting of the control device 11 of this invention to maintain the oven at a lower temperature until the control knob 36 is again manually turned to "off" position thereof.

For example, the housewife or the like can place food in the oven of the system 10 of this invention and turn the control knob 36 to a high cooking temperature so that the food will be cooked at the high temperature for a selected period of time. The housewife can also set a timer clock so that after the lapse of a predetermined time, the timer clock will energize the coil 148 of the heat motor 133. In this manner, the housewife can leave the oven unattended and the control device 11, after a predetermined lapse of time as set by the timer motor, will automatically reduce the temperature setting of the oven by means of the actuator 121 in the manner previously described so that the food therein can remain at a low temperature without further cooking thereof until the housewife eventually returns and turns off the control device 11 whereby the food is maintained at a palatable temperature for serving thereof.

Thus, it can be seen that the heat motor 133 of this invention need only be momentarily energized in a manner sufficiently to heat up the bimetal member 133 so that the end 137 thereof will move toward the plate 137 to move the latch member 151 in a manner to unlatch the actuator 121 so that the same can move from the position illustrated in FIGURE 9 to the position illustrated in FIGURE 10.

When it is desired to turn off the control device 11 of this invention after the same has been reset by the actuator 121 in the manner previously described, the operator rotates the control knob 36 from its "on" position back to its "off" position whereby the tang 86 of the plate member 83 eventually comes into engagement with the tang 119 of the clutch member 116 to move the same back to its "off" position whereby the disc valve 16 is rotated toward its "off" position.

Figure 11:
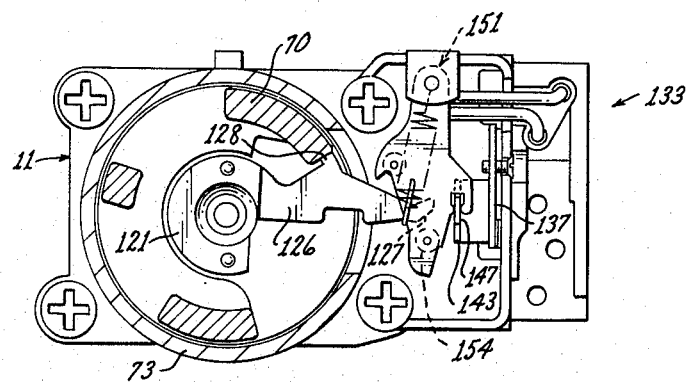
FIGURE 11 is a view similar to FIGURE 8 and illustrates the control device in another operating position thereof.
Figure 15:
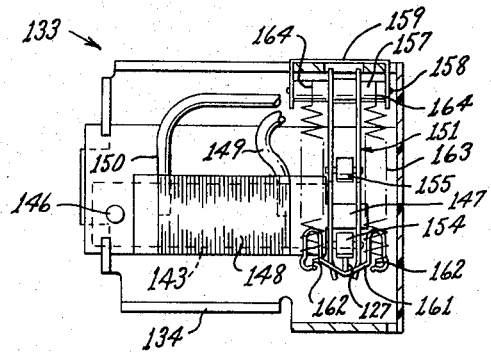
FIGURE 15 is a cross-sectional view taken on line 15—15 of FIGURE 8.

As the disc valve 16 is rotated from the position illustrated in FIGURE 10 back to its "off" position illustrated in FIGURE 8 the embossment 70 of the disc value 16 engages the tang 128 of the actuator 121 and drives the same in a counterclockwise direction as illustrated in FIGURE 11 whereby the end 127 of the arm 126 of the actuator 121 can cam past the roller 154 of the latch member 151 to be again latched by the latch member 151 in the manner illustrated in FIGURE 9 because the bimetal member 143 now is adapted to have the end 147 moved away from the plate 137 to maintain the latch member 151 in the position illustrated in FIGURE 8.

Thus, it can be seen that the control device 11 of this invention has a means for automatically adjusting the temperature setting thereof and holding the control device 11 in the adjusted temperature setting position thereof after the occurrence of event by an actuator 121 which can be relatched in its non-actuating position when the control device 11 is returned to its "off" position.

Accordingly, it can be seen that this invention not only provides an improved control device having many novel and unique features, but also this invention provides improved parts for such a control device or the like.

While the form of the invention now preferred has been disclosed as required by the statutes, other forms may be used, all coming within the scope of the claims which follow.

What is claimed is:

1. In combination, a thermostat unit having means for controlling the heating effect of a heating means, manipulator means for manually setting said thermostat unit at one setting thereof, adjusting means for adjusting the setting of said thermostat unit to another setting thereof when said adjusting means is moved from one position thereof to another position thereof, means for always tending to move said adjusting means to said other position thereof, latch means for normally latching said adjusting means in said one position thereof, and actuating means for unlatching said latch means when said actuating means is actuated whereby said adjusting means moves to said other position thereof.

2. A combination as set forth in claim 1 wherein said adjusting means is movable independently of the operation of said manipulator means.

3. A combination as set forth in claim 1 wherein said manipulator means is adapted to move said adjusting means back to said one position thereof to be latched by said latching means when said manipulator means is moved to an "off" position thereof.

4. A combination as set forth in claim 1 wherein said actuating means includes a heat motor.

5. In combination, a thermostat unit having means for controlling the heating effect of a heating means, said thermostat unit including a movable member for setting a temperature condition to be maintained by said heating means in accordance with the position of said member, a manipulator means for manually setting said member in one position thereof, movable adjusting means for moving said member to another position thereof when said adjusting means is moved from one position thereof to another position thereof, means for always tending to move said adjusting means to said other position thereof, latch means for normally latching said adjusting means in said one position thereof, and actuating means for unlatching said latch member when said actuating means is actuated whereby said adjusting means moves to said other position thereof.

6. A combination as set forth in claim 5 wherein said adjusting member is a rotatable cam member.

7. In combination, a housing having a valve seat, a valve member for opening and closing said valve seat, a fulcrum pin means axially movable in said housing, manual means for engaging and adjusting the axial position of said pin means to one position thereof, a lever fulcrumed on said pin means and being operatively interconnected to said valve member, a temperature responsive device carried by said housing and operatively engaging said lever to fulcrum said lever on said pin means to vary the position of said valve member relative to said valve seat in response to temperature sensed by said temperature responsive device, and rotatable adjusting means carried by said housing to be rotated to one position thereof to disengage said pin means from said manual means and set said pin means in another axial position thereof.

8. A combination as set forth in claim 7 wherein a meat motor is provided and when actuated rotates said adjusting means to said one position thereof.

9. A combination as set forth in claim 7 wherein said adjusting means has means for adjusting the amount of movement of said pin means when said adjusting means is rotated to said one position thereof.

10. A combination as set forth in claim 7 wherein said manual means resets said adjusting means from said one position thereof when said manual means is moved to an "off" position thereof.

11. In combination, a housing having a valve seat, a valve member for opening and closing said valve seat, a fulcrum pin means axially movable in said housing, manual means for engaging and adjusting the axial position of said pin means to one position thereof, a lever fulcrumed on said pin means and being operatively interconnected to said valve member, a temperature responsive device carried by said housing and operatively engaging said lever to fulcrum said lever on said pin means to vary the position of said valve member relative to said valve seat in response to temperature sensed by said temperature responsive device, an adjusting means for adjusting the position of said pin means from said one position thereof to another position thereof when said adjusting means is moved from one position thereof to another position thereof, means for always tending to move said adjusting means to said other position thereof, latch means for normally latching said adjusting means in said one position thereof, and actuating means for unlatching said latch means when said actuating means is actuated whereby said adjusting means moves to said other position thereof.

12. A combination as set forth in claim 11 wherein said adjusting means is movable independently of the operation of said manual means.

13. A combination as set forth in claim 11 wherein said manual means is adapted to move said adjusting means back to said one position thereof to be latched by said latching means when said manual means is moved to an "off" position thereof.

14. A combination as set forth in claim 11 wherein said actuating means includes a heat motor.

References Cited

UNITED STATES PATENTS

| | | | |
|---|---|---|---|
| 1,277,771 | 9/1918 | Swan | 236—87 |
| 1,908,765 | 5/1933 | Kay | 236—102 |
| 2,112,503 | 3/1938 | Meacham | 236—15 |
| 2,363,451 | 11/1944 | Stockrtom | 236—99 X |
| 2,372,307 | 3/1945 | Alexander | 236—51 |
| 2,810,525 | 10/1957 | Wantz | 236—46 |
| 3,004,710 | 10/1961 | Couffer | 236—12 |
| 3,136,483 | 6/1964 | Swanson | 236—51 |

WILLIAM J. WYE, *Primary Examiner.*